E. W. ORMSBEE.
Sap-Spout.
No. 29,905
Patented Sept. 4. 1860.
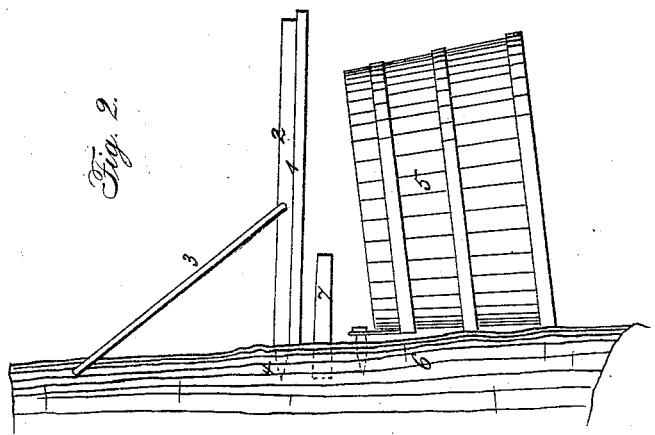
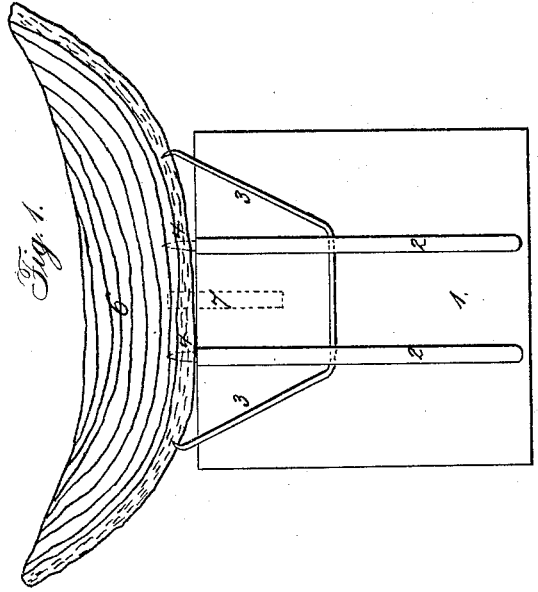
Witnesses:
H. James Weston
Mary S. White
Inventor:
E. W. Ormsbee
By Thos. P. How
atty

UNITED STATES PATENT OFFICE.

ELHANAN W. ORMSBEE, OF MONTPELIER, VERMONT.

IMPROVEMENT IN APPARATUS FOR COLLECTING SAP FROM TREES.

Specification forming part of Letters Patent No. 29,905, dated September 4, 1860.

*To all whom it may concern:*

Be it known that I, ELHANAN W. ORMSBEE, of Montpelier, in the county of Washington and State of Vermont, have invented a certain Improvement in Covers for Sap-Buckets, the construction and operation of which I have described in the following specification and illustrated in its accompanying drawings with sufficient clearness to enable competent and skillful workmen in the arts to which it pertains or is most nearly allied to make and use my invention.

It has often been a matter of serious complaint on the part of the collectors of sap from trees into buckets that in consequence of the want of a cover to the bucket the sap is so much defiled by impurities of different kinds mingling with it as to become in many cases worthless.

My invention is intended to remedy this defect; and it consists in providing a cover which, by means of a spring passed through two ledges on its upper surface and bent at its extremities into a hooked form, and also by means of two projecting points on one of the edges of the said cover, I am enabled to fasten the cover to the bark of the tree from which the sap is being drawn and immediately over the sap-bucket, as hereinafter more fully set forth.

In the accompanying drawings, Figure 1 is a plan of the cover. Fig. 2 is a side elevation.

1 is the cover, on which are planted the ledges 2 2, which project sufficiently above the upper surface of the cover to admit the spring 3. This spring, after being passed through the ledges, is bent into the form shown in Fig. 1 and the extremities turned into a hooked shape, the points projecting inwardly, as shown on the same figure. Two iron points, 4 4, are let into the extremities of the ledges 2 2 and secured there, but in such a manner as to allow them to project sufficiently to be inserted into the bark, and, if necessary, into the wood of the tree, as shown upon the drawings. 5 is the sap-bucket, which is made of the usual form, and attached to the tree 6 in the usual manner, receiving the sap through the spout 7.

The mode of operation is as follows: When the bucket 5 and spout 7 have been fixed in position in the usual manner, the points 4 4 of the cover are forced into the bark of the tree, as shown. The spring 3 is then raised into the position shown in Fig. 2, and the arms being opened sufficiently, the hooked ends are inserted into the bark of the tree, as shown in Fig. 1, in which situation they are firmly held by the recoil of the spring, care being taken to fix the upper ends of the spring in such a position as to allow the cover to have a sufficient drip outward from the tree to discharge any kind of dirt or other impurity which may fall upon it.

It will be seen that from this simple but effective arrangement of parts I am enabled to attach the cover to the tree at four points and at any required height above the bucket, to detach it again with much ease, and to give it any degree of inclination which may be necessary for throwing off the impurities which may fall upon it.

Having thus fully described my invention, what I claim, and desire to have secured to me by Letters Patent, is—

The cover 1, the ledges 2 2, the spring 3, hooked or bent at the ends, as described, and the points 4 4, when the whole are combined and arranged with each other in the manner hereinbefore described, and for the purpose stated.

E. W. ORMSBEF.

Witnesses:
CHAS. D. SWASEY,
T. DUDLEY.